3,113,166
POLYMERIZATION OF ETHYLENE IN THE PRESENCE OF A NICKEL OXIDE CATALYST
William E. Weesner, Dayton, Ohio, assignor to Monsanto Chemical Company, St. Louis, Mo., a corporation of Delaware
No Drawing. Filed Sept. 27, 1961, Ser. No. 140,991
5 Claims. (Cl. 260—683.15)

This invention relates to the polymerization of normally gaseous olefins and to a catalyst composition for use in such polymerization processes. More particularly this invention is directed to a process for the production of liquid, relatively straight chain, olefins obtained by polymerizing ethylene by using a novel modified nickel oxide on a siliceous adsorbent catalyst.

It is known that when ethylene is contacted with some natural and synthetic silica alumina clay catalysts under polymerizing conditions normally solid polyethylene results. Similarly, when ethylene is contacted with a silica alumina catalyst having a minor but significant proportion of nickel oxide impregnated therein, the polymerization product is normally a liquid olefin mixture. However, the olefin product obtained with such a nickel oxide modified catalyst is highly branched, i.e., the olefin compounds in the liquid product have such a high degree of branching that such products are unsuitable where relatively straight chain olefins are desired.

Further, in attempts to modify the effects of nickel oxide on silica alumina catalysts by incorporating therein oxides of boron, beryllium, cadmium, cerium, cobalt, chromium, iron, manganese, palladium, and zinc, polymerization results showed the addition of these oxides into the nickel oxide on silica alumina catalyst composition had little or no effect on the type of olefin product obtained, i.e., the liquid olefin product was a mixture of highly branched olefins. Product distribution and $C_{12}$ olefin $CH_3/CH_2$ ratios (defined hereinafter) were similar to unmodified nickel oxide on silica alumina catalysts with one exception. The chromium oxide added to the nickel oxide on silica alumina catalyst gave solid polyethylene.

It is an object of this invention to provide a process for preparing relatively straight chain liquid olefins.

It is a further object of this invention to provide a process for catalytically polymerizing ethylene to form relatively straight chain liquid olefins.

Another object of this invention is to provide an improved process for polymerizing ethylene to form liquid olefins utilizing a silver or copper oxide modified nickel oxide on a silica alumina type catalyst.

Yet another object of this invention is to provide a process for catalytically polymerizing ethylene using nickel oxide/silica alumina catalyst modified with copper oxide or silver to produce a larger yield of relatively straight chain liquid olefins than is obtained from an unmodified nickel oxide/silica alumina catalyst not containing the copper oxide or silver.

Another object of the invention is to provide a novel catalyst for the polymerization of ethylene to relatively straight chain liquid polymers.

Other aspects, objects, and advantages of this invention are apparent from a consideration of the accompanying disclosure and the appended claims.

According to this invention ethylene is catalytically polymerized in a markedly improved manner to form relatively straight chain liquid olefins, for example, the production of $C_4$ to $C_{12}$ liquid olefins which are relatively straight chained ($CH_3/CH_2$ ratio for $C_{12}$ of 0.45 as compared to 0.63 for $NiO/SiO_2$, $Al_2O_3$) and which contain substantially increased amounts of type II olefin. The catalyst utilized in the improved polymerization process of this invention comprises copper oxide or silver and nickel oxide and an activated or adsorbent natural or synthetic silica alumina composition. The exact catalytic effect or mechanism involved in the use of the silver or copper oxide in conjunction with the nickel oxide on the silica alumina catalyst is not known. However, it might be that the silver or copper oxide reduces the "acidity" of the catalyst so that butene and branched chain hexene dimerizations (which would lead to highly branched liquid $C_{12}$ olefins) are prevented, thus leaving the $C_{12}$ olefin obtained less branched and increasing the amount of $C_4$ and $C_6$ in the product. In view of the results outlined above with oxides of various other metals and metalloids, it was quite surprising to find that addition of silver or copper oxide to a nickel oxide on silica alumina catalyst composition caused this major change in product distribution, composition of $C_{12}$ olefin, and degree of branching in the $C_{12}$ olefin. One would not expect silver and copper oxide to be more basic than other oxides which were ineffective as modifiers.

Also, according to this invention, there is provided a novel polymerization catalyst comprising a major proportion of a natural or synthetic silica alumina and a minor proportion of silver or a copper oxide and nickel oxide. The silica alumina component of the catalyst composition preferably constitutes from 90% to 98% of the total weight of the composition with said silver or copper oxide and nickel oxide comprising from 2 to 8% by weight of said catalyst and the nickel oxide component preferably comprising from 1 to 5% by weight of the catalyst composition and the silver or copper oxide component preferably comprising from 0.1 to 3% by weight of the catalyst composition.

The silica alumina component of the catalyst composition of this invention serves not only as a support or carrier for the silver or copper oxide and nickel oxide components but also contributes to the reaction promoting force of the catalyst composition. In fact, replacement of the silica-alumina of this catalyst composition with another adsorbent carrier or support, such as activated charcoal or alumina, does not produce an effective catalyst for the polymerization of ethylene to relatively straight chain liquid olefins. The silica alumina component employed in this invention should have high surface areas, usually above 300 sq. meters per gram. The silica alumina component may be of synthetic or natural origin. These include the natural and synthetic siliceous adsorbents such as kieselguhr, diatomaceous earth, fullers earth, clays such as bentonite, artificially prepared aluminum silicates, silica alumina gels, and other related materials. Generally, these natural siliceous materials used as the silica alumina component of the catalyst composition contain from 50 to 90% of $SiO_2$, 10 to 20% alumina, and various amounts of minor components, such as from 2–6% $Fe_2O_3$, 0.5 to 3.5% calcium-oxide, 1 to 3% magnesium oxide, etc. The synthetic silica alumina materials may contain substantially only $SiO_2$ and $Al_2O_3$, e.g., from 60 to 90% $SiO_2$ and from 10 to 40% alumina, or may contain minor amounts of non-deleterious components. The silica alumina catalyst may be used in powder form but is usually used in pelleted form. Generally, the silica-alumina component is utilized in the form of particulate pellets upon which silver or copper oxide and nickel oxide are deposited. A typical example of a synthetic silica alumina composition which may be used as a component of the catalyst composition of this invention analyzed as follows:

$Al_2O_3$ ---------------------------- wt. percent -- 12.4
$SiO_2$ ---------------------------- do ---- 87.3 and had the following physical properties:

Pellet size ---------------------------- 4 mm. x 4 mm.
Surface area, m.²/g. ------------------ 375.
Bulk density, kg./liter --------------- 0.54.
Pellet density, kg./liter ------------- 0.86.
Porosity, vol. percent ---------------- 60.
Absorption, wt. percent --------------- 65.
Average pore size, A ------------------ 80.

An example of a natural silica alumina acid clay composition which may be used as a component of this invention is an acid treated mineral montmorillonite (Bentonite) aluminum hydrosilicate (ideal formula

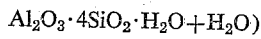

$$Al_2O_3 \cdot 4SiO_2 \cdot H_2O + H_2O)$$

having an approximate bulk density of 0.38 g./cc.

The metal and metal oxide components of the catalyst composition of this invention comprise nickel oxide and a copper oxide or silver. The proportion of the metal and metal oxide components may vary within a wide range but generally the total amount of nickel oxide and copper oxide or silver ranges from about 2% to about 8% by weight of the total weight of the catalyst composition. The proportion of nickel oxide to copper oxide or silver can also vary over a limited range provided that nickel oxide is present in a significant amount on the order of about 1% by weight of the total composition to about 5% by weight. With nickel oxide concentrations in this range, that is, from about 1 to 5% by weight, the copper oxide or silver component proportion can be varied extensively relative to the nickel oxide component. Concentrations of copper oxide or silver on the order of about 0.1% to about 3% by weight, based on the total catalyst composition may be used, with concentrations on the order of from about 0.5% to about 1% being preferred. However, where the nickel oxide component concentration is in the higher range indicated above, copper oxide and silver concentrations in the higher portion of its given range may be used if desired. However, even at relatively large concentrations or proportions of the nickel oxide component, small concentrations of silver, or copper oxide have a desirable effect.

The catalyst compositions of this invention may be prepared according to procedures known to those skilled in the art of catalyst manufacture, the essential feature being to obtain a silica-alumina catalyst having deposited thereon the nickelous oxide, and the silver or copper oxide in their forms obtained by heat decomposing a water soluble nickel, silver or copper salt in the silica alumina matrix. Thus, the catalyst composition of this invention may be obtained conveniently by co-impregnating the silica alumina with a mixed solution of nickelous nitrate and silver nitrate or cupric nitrate, and heating the impregnated material to dry it, to decompose the nitrate, and activate the catalyst composition. In co-impregnating with silver nitrate, it was assumed that metallic silver was formed on activation, while with copper nitrate it was assumed that cupric oxide was formed.

Although the activation of the catalysts of this invention is usually accomplished by heating the impregnated catalyst in a current of an oxygen-containing gas, other methods of activating the catalysts involve passing a stream of inert gas, such as nitrogen, helium, argon, over the catalysts at an elevated temperature in the desired temperature range. The time required for effecting activation of the catalysts will vary widely, depending on the nature of the catalysts and the temperature selected for activation. The usual activation times range from 2 to 10 hours duration. Preferred activation temperatures range from about 300° C. to about 600° C. for from 2 to 6 hours.

The novel catalysts of this invention can be employed in various forms and sizes such as pellets, granules, powders, broken pieces and lumps. Convenient forms in which the catalysts may be employed are as granules of from about 20 to 100 mesh size range or in pellets of from about 2 mm. by 2 mm. to 4 mm. by 4 mm. size.

In effecting the process of this invention, temperatures within the range of about 50 to 150° C. may be employed, although to obtain optimum yields of liquid olefin fraction of the desired types, temperatures ranging from about 90° C. to 110° C. are preferred. Higher temperatures on the order of from 110° C. to 200° C. are useful for obtaining higher conversions of ethylene with some sacrifice in yield of desired liquid olefin fractions. The polymerization process can be effected at autogeneous pressures; however, usually pressures above 200 p.s.i.g. are used in order to avoid the use of higher temperatures and longer reaction times. Ordinarily, the pressure is maintained below 10,000 p.s.i.g. even though pressures above this figure may be used if desired. In general, it is only necessary that the pressure be sufficient to maintain some liquid phase in the reaction zone, although high pressures favor the polymerization reaction. The polymerization reactions can be carried out in either batch or continuous flow reactors. In carrying out the reaction under continuous flow conditions, the liquid hourly space velocity is preferably maintained less than 1. In effecting batch polymerization, the operating period may range from about 3 to about 20 hours.

It is usually desirable to carry out the polymerization reaction of this invention in a well dried, inert reaction medium or solvent, such as a saturated aliphatic hydrocarbon or a saturated cyclic hydrocarbon. The saturated aliphatic hydrocarbon may contain from 5 to 12 carbon atoms and include, for example pentanes, hexanes, heptanes, octanes, dodecanes, and the like. Suitable saturated cyclic hydrocarbons include cyclohexane, decahydronaphthalene, and the like. Other diluents can also be used in the process of this invention provided that they are relatively inert, readily separated from the polymerization effluent, and exist as a liquid phase under the selected reaction conditions.

Ethylene polymerization using the novel catalyst of this invention may be performed with normal ethylene feed stocks such as refinery gases which can also contain inert hydrocarbons such as paraffins, e.g., ethane, which are not polymerized by the novel catalysts of this invention under these reaction conditions to form relatively straight chain liquid olefins. It is necessary, however, to remove water, ammonia, hydrogen sulfide and acetylenes from the feed stock since these materials act as catalyst poisons.

To determine the degree of branching in the chemical structure of the higher liquid olefin products prepared by the processes described above, an infrared (IR) procedure has been developed which determines the ratio of methyl to methylene groups in the molecule, generally written as "$CH_3/CH_2$." The ratio is determined by dividing the number of methyl groups in the olefin by the number of methylene groups. Thus, n-dodecane has a calculated $CH_3/CH_2$ ratio of 0.2, whereas 2,4,6-trimethylnonane has a calculated $CH_3/CH_2$ ratio of 1.25. In general, olefins with low $CH_3/CH_2$ ratios are straighter chained and thus are more desirable for many applications.

Another general analysis test for higher olefins is the so-called type analysis. This analysis determines the degree of branching around the double bond. The results are expressed as percent of the five possible types listed below:

Type I _____ RCH=CH$_2$
Type II (cis and trans) _____ RCH=CHR
Type III _____ R$_2$C=CH$_2$
Type IV _____ R$_2$C=CHR
Type V _____ R$_2$C=CR$_2$ To determine all five types is difficult and time consuming and requires both IR and ultra-violet determinations, since type V cannot be detected by IR alone. To simplify this analysis, only IR measurements were used to obtain relative ratios of types I, II, III and IV. Olefins consisting predominantly of types I and II are usually less branched and therefor more suitable as intermediates for further reaction.

Neither of these two tests are infallible. For example, in the "CH$_3$/CH$_2$ ratio" test terminal isopropyl and terminal tert.-butyl groups cause abnormally low values making the results only rough indications of extent of branching. Similarly, the type analysis test gives no indication about the nature of the R groups. For example, 1-dodecene and 3,5,8-trimethyl-1-nonene are both type I olefins. But the two tests combined generally give a good indication of the chemical structure of the olefin product obtained and provide good means for comparing olefin fractions obtained by the use of different catalysts in ethylene polymerization processes.

The liquid olefin products obtained by the process of this invention using the novel catalysts described herein have a greater percentage of types I and II, with lower CH$_3$/CH$_2$ ratios than are obtainable by the use of a catalyst comprising nickel oxide on silica alumina. The novel catalysts of this invention reduce the amounts of type IV olefin obtained and thus increases the value of the olefin product obtained where a more straight chain olefin is desired.

Liquid olefin fractions obtained according to the process of this invention are useful as intermediates in the preparation of alcohols via the oxo process by reaction with carbon monoxide and hydrogen and for making lubricating oil detergents. The higher olefin fractions, C$_{10}$–C$_{18}$, are also useful directly as alkylating agents in making alkylarylsulfonate detergent chemicals.

The advantages, desirability and usefulness of the present invention are further illustrated by the following examples:

*Example 1*

In this example, a nickel oxide on silica alumina catalyst was prepared without including a silver or copper oxide component and used to effect polymerization of ethylene.

To 30 g. of synthetic silica alumina catalyst pellets containing 87.3 wt. percent of silica and 12.4 wt. percent of alumina having a surface area of 375 meters$^2$/g., a bulk density of 0.54 kg./liter, a pellet density of 0.86 kg./liter, a 60 vol. percent porosity index, 65 wt. percent absorption index, and an average pore size of 80 angstroms, there was added 5.8 g. of Ni(NO$_3$)$_2$·6H$_2$O in 18 ml. of water. The thus-impregnated silica alumina was air dried for about 4 hours at 135° C., and activated by heating the dried catalyst in a flow of moist air (saturated with water at 0° C.) at a rate of 68 ml./minute for 6 hours at 500–580° C./50–55 mm.

Ethylene polymerization was conducted as follows:

A clean, dry 300 ml. stainless steel rocking autoclave was flushed with nitrogen, and then 6.9 g. of the NiO/SiO$_2$·Al$_2$O$_3$ catalyst, prepared above, and 10 ml. of dry n-heptane were added under nitrogen. After sealing, the bomb was weighed, cooled in Dry Ice and charged with dry ethylene from a small transfer cylinder. Reweighing indicated 71 g. of ethylene had been added. The autoclave was then placed in an electrically heated rocker and held at 85–92° C. for 10 hours. The pressure dropped from 600 lbs. to 300 lbs. during this time. After cooling to room temperature, the bomb was reweighed to establish that no leaks had occurred, and then vented through a Dry Ice trap to remove 1 g. of unreacted ethylene. The bomb was cooled in Dry Ice and the contents thereof (83.3 g. including the catalyst) were poured into a previously cooled distilling vessel and distilled through a Podbielniak-type column. There was obtained 65.8 g. of product which analyzed as containing 18% C$_4$, 9% C$_6$, 19% C$_8$, 21% C$_{10}$, 15% C$_{12}$, and 18% greater than C$_{12}$. The C$_{12}$ olefin fraction analyzed as containing no type I olefin, only 6% type II olefin, 19% type III olefin, and 76% type IV olefin, and the CH$_3$/CH$_2$ ratio was 0.63, which data are consistent with a highly branched olefin product.

*Example 2*

This example illustrates the effect of using a silver on silica alumina catalyst, without including the nickel oxide as a modifying agent in the catalyst composition to polymerize ethylene.

Seventeen ml. of a silver nitrate solution, prepared by adding 2.66 g. of silver nitrate to 15.7 ml. of water, was used to impregnate 30 g. of a synthetic silica alumina catalyst as described in Example 1. This was calculated to give a catalyst containing 5 weight percent of silver upon drying and activation as described in Example 1.

Using the same procedure as that described in Example 1, 9.0 g. of Ag/SiO$_2$·Al$_2$O$_3$, 6.8 g. of dry n-heptane and 62 g. of ethylene were combined in the bomb and reacted for 10 hours at 90° C. Analysis of the product obtained indicated only 10% ethylene conversion. The only product was solid polyethylene polymer. The remaining material was recovered ethylene.

*Example 3*

A catalyst composition was prepared by impregnating 30 g. of silica alumina described in Example 1 with a solution of 3.1 g. of NiNO$_3$·6H$_2$O and 1.2 g. of AgNO$_3$ in 23 ml. of water, drying, and activating as described in Example 1 to obtain a catalyst containing 2.5% NiO and 2.4% Ag.

In a bomb reactor, there was combined 7.3 g. of the above catalyst, 10 ml. of dry n-heptane, and 68 g. of ethylene. The reaction mixture was heated at 90° C. for 10 hours with the initial pressure being 1800 p.s.i.g. Distillation of the reaction product gave 60.4 g. of liquid olefin (89% conversion). The CH$_3$/CH$_2$ ratio of the C$_{12}$ portion was 0.46 and it was 9% type I olefin, 70% type II olefin, 6% type III, and only 15% type IV olefin.

*Example 4*

A catalyst was prepared by impregnating 30 g. of synthetic silica alumina of the type described in Example 1, with 21 ml. of a solution containing 6.32 g. of Ni(NO$_3$)$_2$·6H$_2$O and 1.28 g. of AgNO$_3$, drying and activating as described in Example 1 to obtain a catalyst containing 5 wt. percent of NiO and 2.5 wt. percent of Ag.

To 8.6 g. of this catalyst in a bomb reactor there was added 6.8 g. of dry n-heptane and 67 g. of ethylene. Heating the rocking bomb reactor to 90° C. for 10 hours under pressure as described in Example 1, caused an ethylene conversion of 98%. There was obtained 66.1 g. of liquid olefin product. The C$_{12}$ portion had a CH$_3$/CH$_2$ ratio of 0.48, and analyzed as containing 9% type I olefin, 70% type II olefin, 7% type III, and only 14% type IV olefin.

*Example 5*

A catalyst was prepared by impregnating 30 g. of synthetic silica alumina of the type described in Example 1 with 21 ml. of an aqueous solution containing 6.2 g. of NiNO$_3$·6H$_2$O and 0.25 g. of AgNO$_3$, drying and activating as described in Example 1, to obtain a catalyst containing 5 wt. percent of NiO and 0.5 wt. percent of silver.

To 8.2 g. of the above catalyst in a bomb reactor there was added 6.8 g. of dry n-heptane and 55 g. of ethylene. The rocking bomb reactor was heated for 10 hours at 90° C. under pressure as described in Example 1. There was obtained 54.5 g. of liquid olefin product (99% conversion). The $C_{12}$ fraction had a $CH_3/CH_2$ ratio of 0.59, and contained 2% type I olefin, 41% type II olefin, 11% type III olefin, and 46% type IV olefin.

*Example 6*

A catalyst was prepared by impregnating 30 g. of synthetic silica alumina of the type described in Example 1, with 21 ml. of a solution containing 6.2 g. of $NiNO_3 \cdot 6H_2O$ and 0.50 g. of $AgNO_3$, drying, and activating as described in Example 1 to obtain a catalyst containing 5 wt. percent of NiO, and 1 wt. percent of Ag.

To 9.4 g. of the above prepared catalyst in a bomb reactor, there was added 6.8 g. of dry n-heptane and 67 g. of ethylene. The bomb reactor and its contents were heated at 90° C. for 10 hours under pressure as described in Example 1. There was obtained for distillation 65.8 g. of liquid olefin product (98% conversion). Distillation of the olefin product showed that the $C_{12}$ olefin product had a $CH_3/CH_2$ ratio of 0.58 and contained 3% type I olefin, 47% type II olefin, 9% type III olefin, and only 41% type IV olefin.

*Example 7*

A catalyst composition was prepared by impregnating 30 g. of silica alumina with an aqueous solution containing 6.24 g. of $Ni(NO_3)_2 \cdot 6H_2O$ and 0.97 g. of $Cu(NO_3)_2 \cdot 3H_2O$, drying and activating as described in Example 1 to obtain a catalyst containing 5 wt. percent of NiO and 1 wt. percent of CuO.

To 8.6 g. of the above catalyst in a bomb reactor there was added 6.8 g. of dry heptane, and 59 g. of ethylene. The sealed reaction mixture was heated at 90 to 109° C. for 10 hours. The pressure dropped from 1300 p.s.i.g. to 200 p.s.i.g. during this time. There was obtained 50.8 g. of liquid olefin product for distillation. The $C_{12}$ olefin fraction had a $CH_3/CH_2$ ratio of 0.59 and contained 2% type I olefin, 46% of type II olefin, 15% type III olefin, and only 37% type IV olefin.

*Example 8*

Another CuO containing catalyst was prepared by impregnating 30 g. of silica alumina with 5.8 g. of $Ni(NO_3)_2 \cdot 6H_2O$ and 1.0 g. of $Cu(NO_3)_2 \cdot 3H_2O$ in 18 ml. of water. After drying, and activating as described in Example 1, the resulting catalyst composition was used to polymerize ethylene.

To 6.3 g. of the above prepared catalyst composition which contained 4.7 wt. percent of NiO and 1 wt. percent of CuO there was added 10 ml. of dry heptane and 49 g. of ethylene in a bomb reactor. The reaction mixture was heated at 90° C. for 10.5 hours. The pressure dropped from 1000 p.s.i.g. to 400 p.s.i.g. during this time. Upon completion of the reaction there was obtained for distillation 42 g. of liquid olefin product. The $C_{12}$ fraction had a $CH_3/CH_2$ ratio of 0.55 and contained 4% type I olefin, 50% type II olefin, 10% type III, and only 37% type IV olefin.

I claim:

1. A process for preparing liquid olefin polymers from ethylene which comprises contacting ethylene under polymerization conditions, including a temperature range of from 50° C. to 150° C., with a catalyst comprising 90 to 98% of silica alumina, 1 to 5% nickel oxide, and from 0.1 to 3% of a member of the group consisting of copper oxide and silver.

2. A process for preparing liquid olefin polymers from ethylene which comprises contacting ethylene under polymerization conditions, including a temperature range of from 80 to 110° C. with a catalyst which comprises from 90% to 98% silica alumina, from 1% to 5% nickel oxide, and from 0.5 to 3% silver.

3. A process for preparing liquid olefin polymers from ethylene which comprises contacting ethylene under polymerization conditions, including a temperature range of from 80° C. to 110° C. with a catalyst which comprises from 90% to 98% silica alumina, from 1% to 5% nickel oxide, and from 0.5 to 3% copper oxide.

4. A process according to claim 2 wherein the catalyst is prepared by impregnating silica alumina with aqueous solutions of nickelous nitrate and silver nitrate, drying the thus-impregnated silica alumina, and activating the dried impregnated silica alumina.

5. A process according to claim 3 wherein the catalyst is prepared by impregnating silica alumina with aqueous solutions of nickelous nitrate and cupric nitrate, drying the thus-impregnated silica alumina, and activating the dried impregnated silica alumina.

References Cited in the file of this patent

UNITED STATES PATENTS

| | | |
|---|---|---|
| 2,320,063 | Borkowski et al. | May 25, 1943 |
| 2,666,756 | Boyd et al. | Jan. 19, 1954 |
| 2,750,261 | Ipatieff et al. | June 12, 1956 |
| 2,881,233 | Clark | Apr. 7, 1959 |
| 2,904,608 | Holm et al. | Sept. 15, 1959 |
| 3,005,033 | Engelbrecht et al. | Oct. 17, 1961 |